(12) United States Patent
Silva

(10) Patent No.: US 12,119,720 B2
(45) Date of Patent: Oct. 15, 2024

(54) TRI-MOTOR

(71) Applicant: Pure Energy LLC, Ciudad Autónoma de Buenos Aires (AR)

(72) Inventor: Ruben Dario Silva, Billinghurst (AR)

(73) Assignee: Pure Energy LLC, Buenos Aires (AR)

( * ) Notice: Subject to any disclaimer, the term of this patent is extended or adjusted under 35 U.S.C. 154(b) by 285 days.

(21) Appl. No.: 17/482,948

(22) Filed: Sep. 23, 2021

(65) Prior Publication Data
US 2023/0089844 A1    Mar. 23, 2023

(51) Int. Cl.
*H02K 27/14*    (2006.01)
*H02K 13/00*    (2006.01)

(52) U.S. Cl.
CPC ........... *H02K 27/14* (2013.01); *H02K 13/006* (2013.01)

(58) Field of Classification Search
CPC ...... H02K 27/14; H02K 13/006; H02K 23/00; H02K 25/00
See application file for complete search history.

(56) References Cited

U.S. PATENT DOCUMENTS

| | | |
|---|---|---|
| 3,297,891 A | 1/1967 | Foran |
| 3,662,196 A * | 5/1972 | Ruschmann ........... H02K 25/00 310/46 |
| 3,728,567 A * | 4/1973 | Picmaus ................. H02K 3/28 310/198 |
| 3,900,780 A | 8/1975 | Tanikoshi |
| 4,475,068 A | 10/1984 | Brailsford |
| 4,628,231 A | 12/1986 | Radziwill et al. |
| 4,642,534 A | 2/1987 | Mitchell |
| 4,775,812 A * | 10/1988 | Kitamori ................ H02K 16/00 310/156.05 |
| 4,857,783 A | 8/1989 | Prunkard |
| 6,248,037 B1 | 6/2001 | Forster |
| 7,795,773 B1 | 9/2010 | Wittig |

(Continued)

FOREIGN PATENT DOCUMENTS

| | | |
|---|---|---|
| CN | 101924438 B | 10/2011 |
| CN | 101958623 B | 1/2013 |

(Continued)

OTHER PUBLICATIONS

International Search Report and Written Opinion for International Application No. PCT/IB2022/058975, filed Sep. 22, 2022, mailed Jan. 5, 2023.

*Primary Examiner* — Leda T Pham
(74) *Attorney, Agent, or Firm* — Fox Rothschild LLP

(57) ABSTRACT

An electric motor is provided. The electric motor can include a first submotor that includes a first stator component and a first rotor component, one of the first stator component and the first rotor component including a plurality of first magnets, and the other of the first stator component and the first rotor component including a plurality of conductive first windings. The electric motor can include a second submotor that includes a second stator component and a second rotor component, one of the second stator component and the second rotor component including a plurality of second magnets, and the other of the second stator component and the second rotor component including a plurality of conductive second windings. At least one of the first windings can be electrically connected in series to at least one of the second windings.

26 Claims, 15 Drawing Sheets

(56) References Cited

U.S. PATENT DOCUMENTS

| | | |
|---|---|---|
| 8,575,880 B2 | 11/2013 | Grantz |
| 9,553,487 B2 | 1/2017 | Seo et al. |
| 10,056,808 B2 | 8/2018 | Pozmantir et al. |
| 10,476,360 B2 * | 11/2019 | Hunter ................ B60K 7/0007 |
| 10,700,562 B2 | 6/2020 | Chen et al. |
| 10,998,778 B2 * | 5/2021 | Long ..................... H02K 1/182 |
| 2004/0178757 A1 | 9/2004 | Petersen |
| 2015/0048712 A1 | 2/2015 | Janecek et al. |
| 2016/0149476 A1 | 5/2016 | Qin et al. |

FOREIGN PATENT DOCUMENTS

| | | |
|---|---|---|
| CN | 107134882 A | 9/2017 |
| CN | 211321176 U | 8/2020 |
| JP | 2008252979 A | 10/2008 |

\* cited by examiner

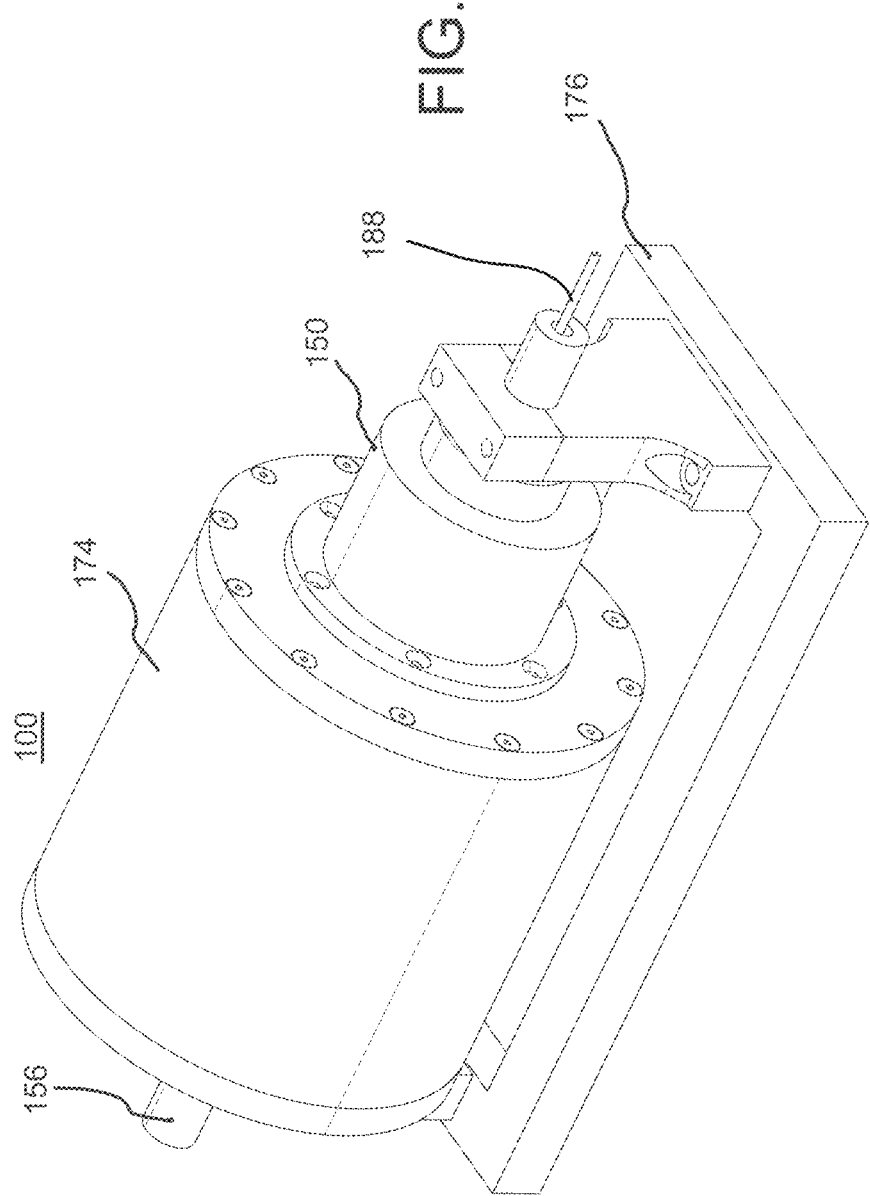

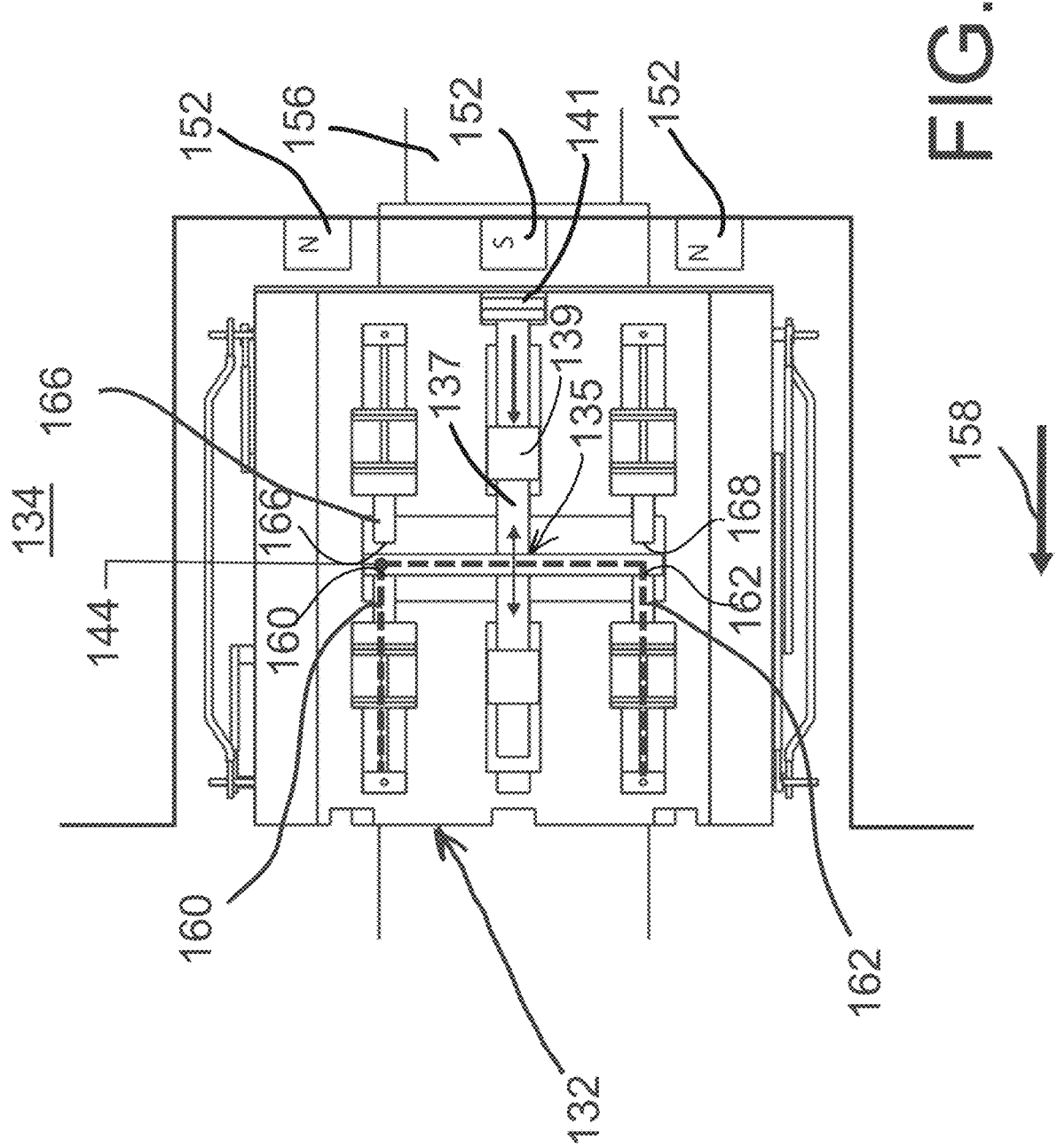

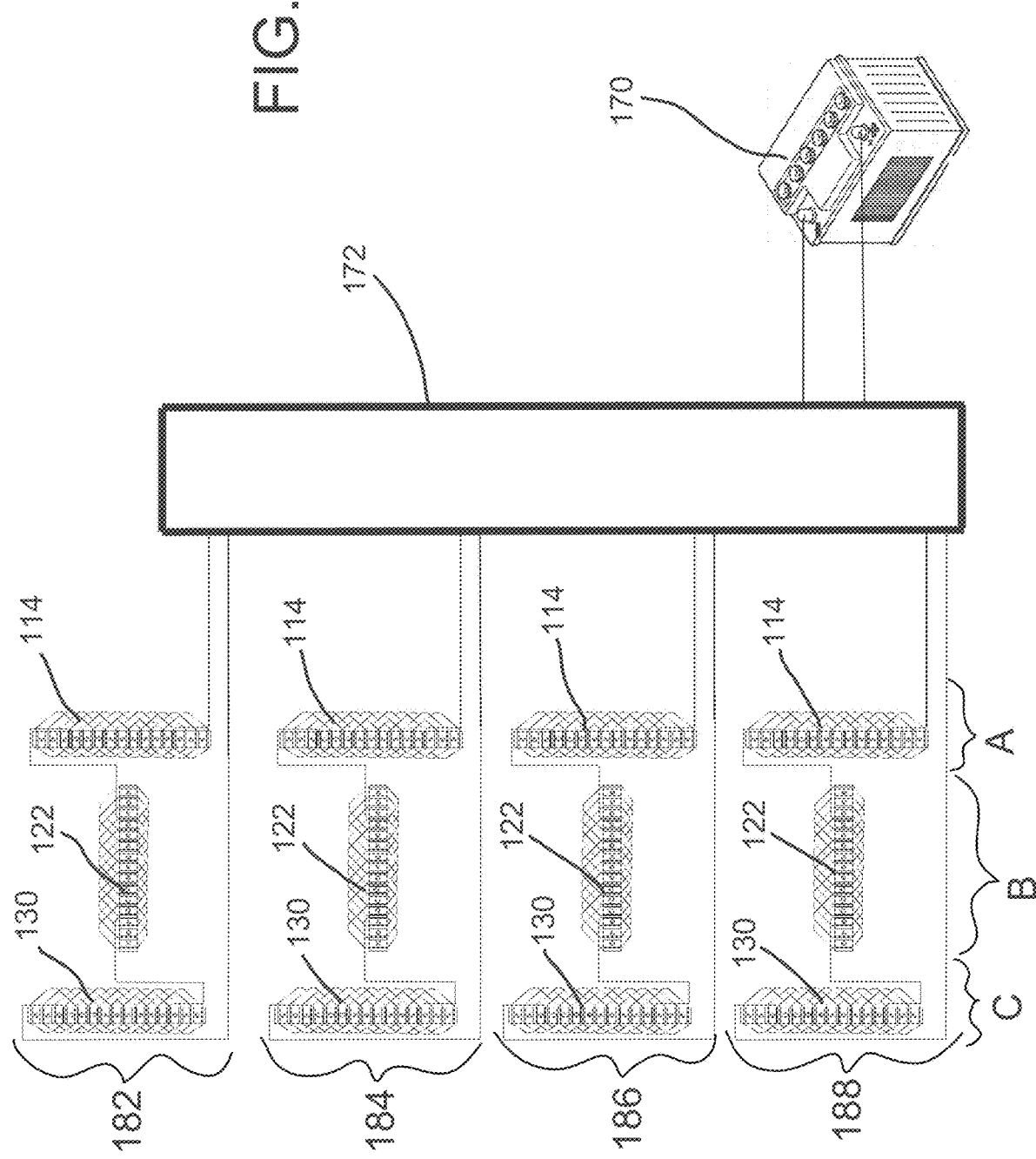

TRI-MOTOR

FIELD OF THE INVENTION

The present disclosure relates generally to electric motors and, in particular, to electric motors having commutators and submotors.

BACKGROUND

Traditional electric motors include a stator component and a rotor component that is rotatable with respect to the stator component. Generally, an electric current will flow through one or more conductive wires. The flow of the electric current causes a series of magnets to rotate about, and with respect to, the one or more conductive wires, producing a torque force which can be used to move one or more mechanical components.

Traditional electric motors are not configured to enable the one or more conductive wires to take a wide range of voltages without the incorporation of one or more heat sinks. This increases the number of components needed for the electric motor and decreases the efficiency of the electric motor. Thus, an electric motor capable of enabling a conductive wire to take a wide range of voltages without the need for a heat sink is needed.

SUMMARY

According to various embodiments, an electric motor is provided. The electric motor can include a first submotor that includes a first stator component and a first rotor component that is rotatable with respect to the first stator component, one of the first stator component and the first rotor component including a plurality of first magnets, and the other of the first stator component and the first rotor component including a plurality of conductive first windings that are operatively associated with the plurality of first magnets to produce torque in the first rotor component. The electric motor can include a second submotor that includes a second stator component and a second rotor component that is rotatable with respect to the second rotor component, one of the second stator component and the second rotor component including a plurality of second magnets, and the other of the second stator component and the second rotor component including a plurality of conductive second windings that are operatively associated with the plurality of second magnets to produce torque in the second rotor component. At least one of the first windings can be electrically connected in series to at least one of the second windings.

According to various embodiments, each of the first windings can be electrically connected in series to at least one of the second windings. According to various embodiments, each of the second windings can be electrically connected in series to at least one of the first windings.

According to various embodiments, the first and second submotors can have a same number of phases that include different sets of the first windings and magnets and different sets of the second windings and magnets, respectively. The first windings and second windings of each phase can be connected in series.

According to various embodiments, the first submotor can have a first phase that includes at least one of the first magnets and at least one of the first windings, and a second phase that includes at least another of the first magnets and another of the first windings. According to various embodiments, the second submotor can have a first phase that includes at least one of the second magnets and at least one of the second windings, which second windings of the first phase are connected in series with the first windings of the first phase, and a second phase that includes at least another of the second magnets and another of the second windings, which second windings of the second phase are connected in series with the first windings of the second phase.

According to various embodiments, the electric motor can include a third submotor, including a third stator component and a third rotor component that is rotatable with respect to the third rotor component, one of the third stator component and the third rotor component including a plurality of third magnets, and the other of the third stator component and the third rotor component including a plurality of conductive third windings that are operatively associated with the plurality of third magnets to produce torque in the third rotor component. According to various embodiments, the third motor can have a first phase that includes at least one of the third magnets and at least one of the third windings, which third windings of the first phase are connected in series with the first and second windings of the first phase, and a second phase that includes at least another of the third magnets and another of the third windings, which third windings of the second phase are connected in series with the first and second windings of the second phase. According to various embodiments, the first and second submotors can be coaxial.

According to various embodiments, the plurality of first magnets can include magnets of alternating polarity, alternating between north and south circumferentially around the first submotor, the plurality of second magnets can include magnets of alternating polarity, alternating between north and south circumferentially around the second submotor, and the polarities of the first magnets can be coaxially out of phase with the polarities of the second magnets. According to various embodiments, the first and second rotor components can be part of a single rotor and are fixed with respect to each other.

According to various embodiments, the first magnets of the first phase can be circumferentially shifted coaxially with respect to the second magnets of the first phase, and the first magnets of the second phase can be circumferentially shifted coaxially with respect to the second magnets of the second phase. According to various embodiments, the first magnets of the first phase can be shifted circumferentially by an angle corresponding to a width of the first phase, and the first magnets of the second phase can be shifted circumferentially by an angle corresponding to a width of the second phase. According to various embodiments, the first and second submotors can each include at least two phases, with the first and second submotors including a same number of phases, each of the at least two phases can correspond to a segment of each of the first and second submotors, and the first magnets of each phase can be shifted circumferentially by an angle corresponding to a width of a respective segment of each phase.

According to various embodiments, another electric motor is provided. The electric motor can include a stator and a rotor that is rotatable with respect to the stator. One of the stator and the rotor can include a plurality of magnets, and the other of the stator and the rotor can include a plurality of conductive windings that are operatively associated with the plurality of magnets to produce torque in the rotor. A plurality of sets of the magnets and the windings can be operatively associated as a plurality of submotors, each submotor including a portion of the stator and a portion of the rotor, and a plurality of phases of each submotor each include a group of the windings and the magnets of the respective submotor. The plurality of submotors can have a same number of phases, and the windings within a same phase of the plurality of submotors can be electrically connected in series.

According to various embodiments, the windings and the magnets of each of the phases in each submotor can be shifted circumferentially on the stator and the rotor with respect to the same phases in another of the plurality submotors. According to various embodiments, the windings and the magnets of each of the phases in each submotor can be shifted circumferentially by an angle corresponding to a width of each phase. According to various embodiments, each of the plurality of phases can correspond to a segment of each of the submotors, and, for each phase, the windings and the magnets in each submotor can be shifted circumferentially by an angle corresponding to a width of each respective phase.

According to various embodiments, the electric motor can include a commutator electronically connected, and configured to direct a flow of current to each of the conductive windings, and the commutator including a plurality of switches, wherein each switch includes a positive position and a negative position. According to various embodiments, the positive position and the negative position can be the only operative positions of the commutator. And the commutator can be configured to switch directly from the positive position to the negative position and directly from the negative position to the positive position.

According to various embodiments, each of the plurality of conductive windings can be connected, at one end, to a subsequent conductive winding, and connected, at a second end, to a switch of the commutator.

According to various embodiments, the plurality of submotors can include a radial submotor and an axial submotor. According to various embodiments, the plurality of magnets can include one or both of permanent magnets and electromagnets. According to various embodiments, the plurality of magnets of all of the plurality of submotors can be permanent magnets or electromagnets.

According to various embodiments, yet another electric motor is provided. The electric motor can include a stator and a rotor that is rotatable with respect to the stator, with one of the stator and the rotor including a plurality of magnets, and the other of the stator and the rotor includes a plurality of conductive windings that are operatively associated with the plurality of magnets to produce torque in the rotor. A plurality of phases of each submotor can each include a group of the windings and the magnets. The electric motor can further include a commutator electronically connected, and configured to direct a flow of current, to each of the conductive windings, the commutator including a plurality of switches, wherein each switch includes a positive position and a negative position.

According to various embodiments, the positive position and the negative position can be the only operative positions of the commutator, and the commutator can be configured to switch directly from the positive position to the negative position and directly from the negative position to the positive position.

According to various embodiments, each of the plurality of conductive windings can be connected, at one end, to a subsequent conductive winding, and connected, at a second end, to a switch of the commutator.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 1 is a perspective view of an embodiment of an electric motor;

FIG. 8A is a view of a face of the commutator of FIG. 5 with the commutator switch in a positive position;

FIG. 9C is an electrical diagram of the commutator and the conductive windings, with the electric motor power by alternating current;

DETAILED DESCRIPTION

Figure 2A:
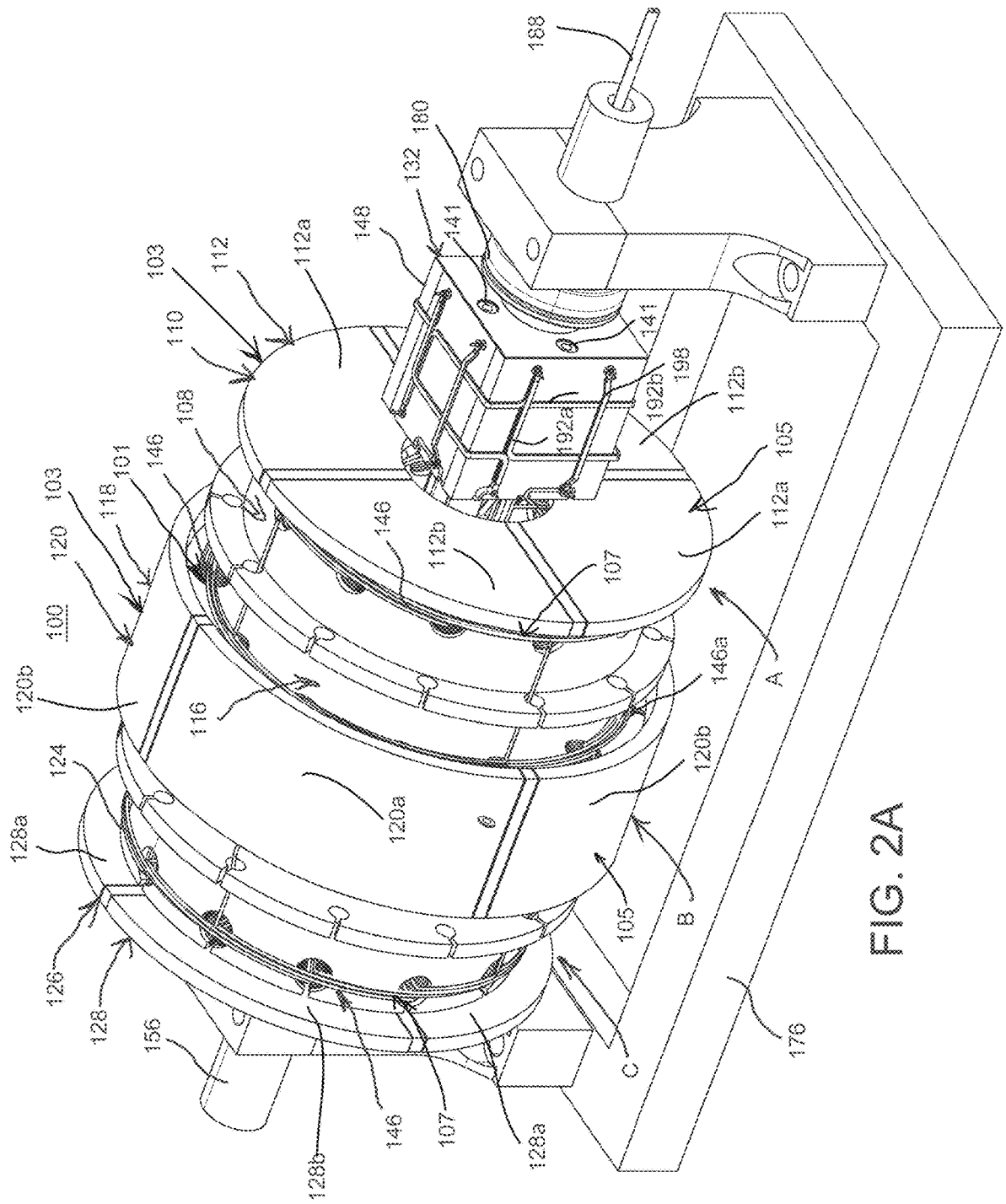
FIG. 2A is a perspective view of the electric motor of FIG. 1 with an outer housing removed.
Figure 2B:
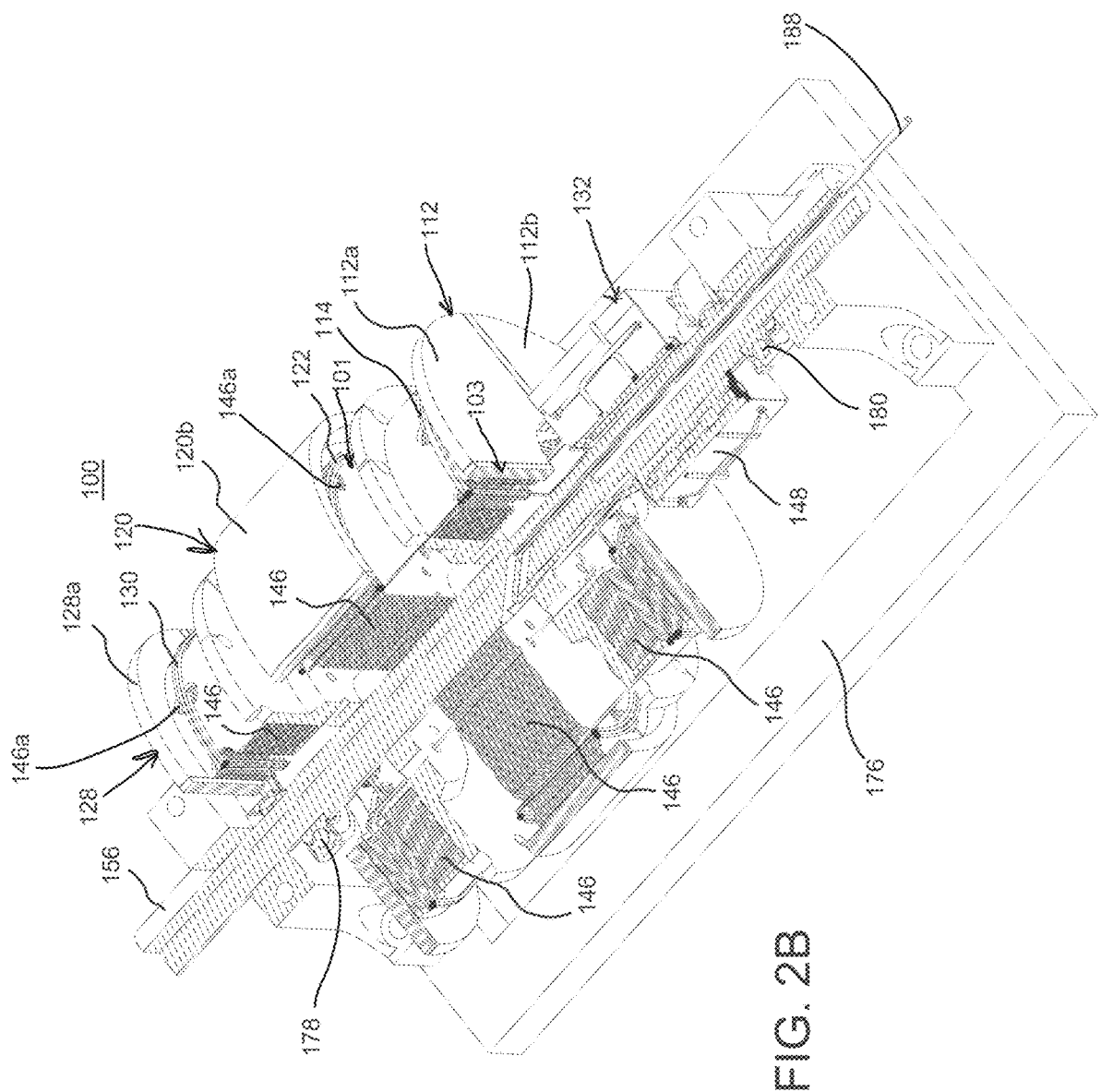
FIG. 2B is a partial cut-away view of the electric motor of FIG. 2A.
Figure 3:
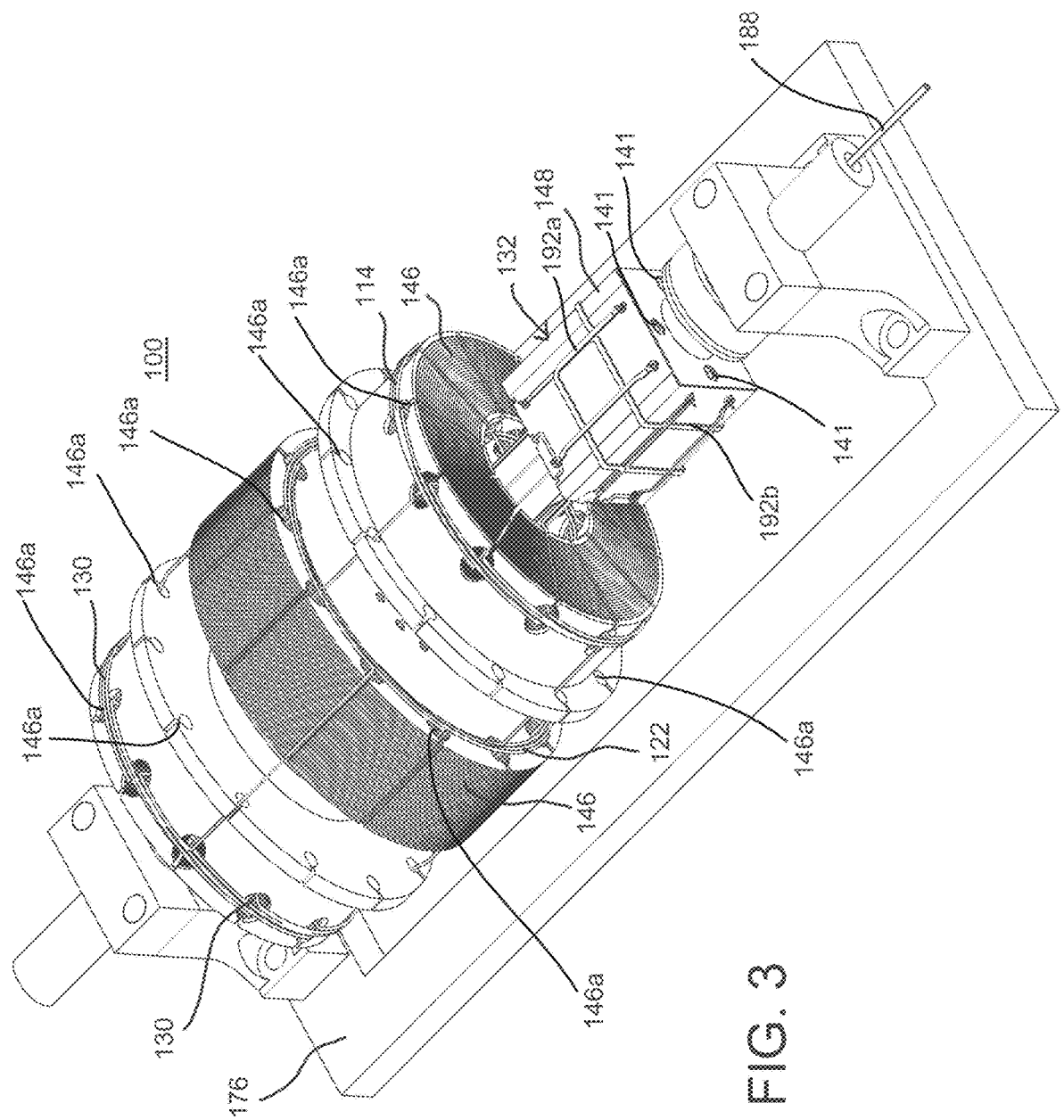
FIG. 3 is a perspective view of the electric motor of FIG. 2A with magnets removed.
Figure 4:
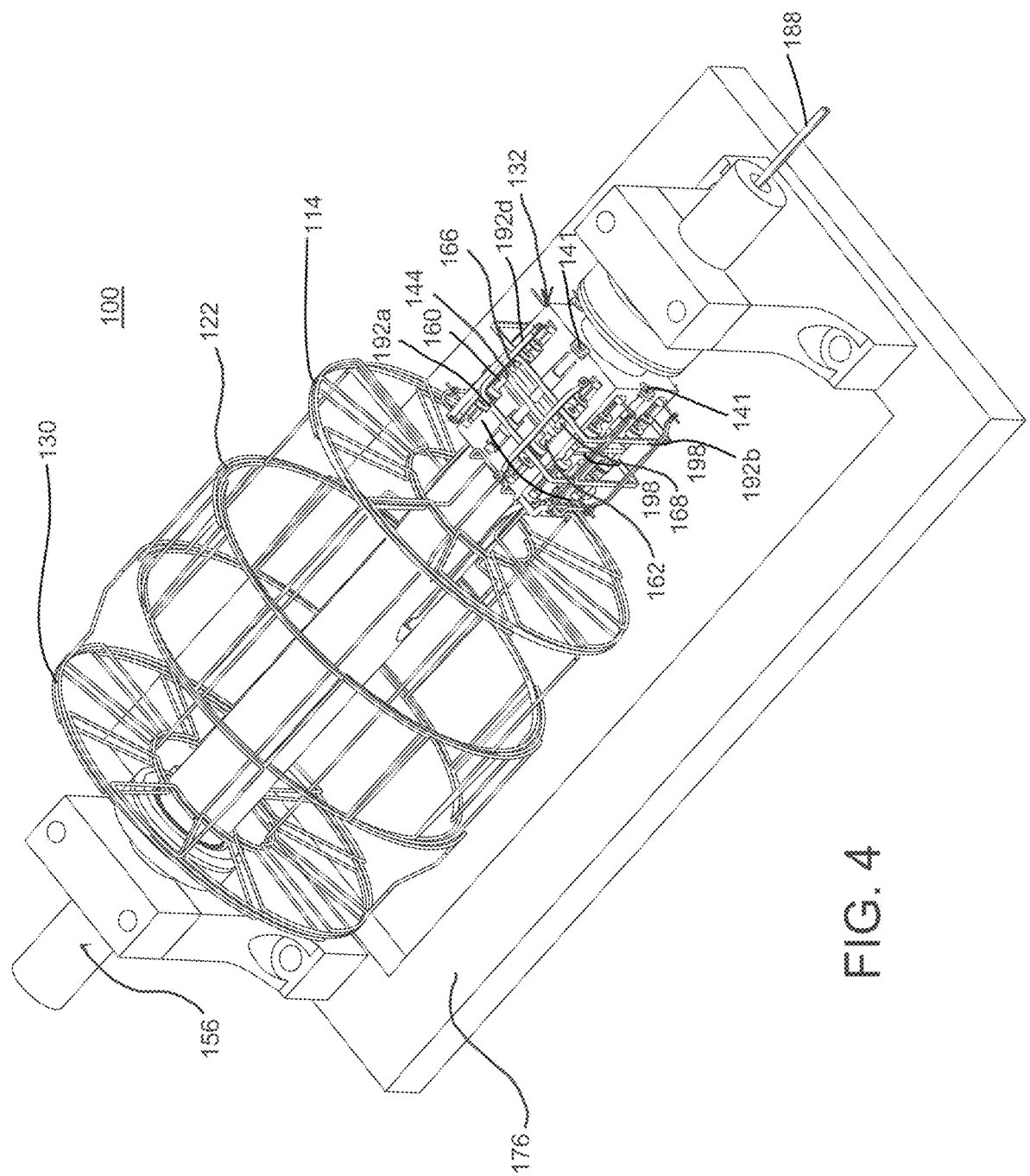
FIG. 4 is a perspective view of the electric motor of FIG. 4 with the cores removed that support the windings, and with the commutator casing removed.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples can be utilized, and other changes can be made without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are implicitly contemplated herein.

Referring now to FIGS. 1-4, various views of an embodiment of electric motor 100 are illustratively depicted. The electric motor 100 includes a plurality of submotors. The electric motor 100 can include three submotors; submotor A, submotor B, submotor C. It is noted, however, that, in other embodiments, the electric motor 100 can include other suitable numbers of submotors while maintaining the spirit and functionality of the present disclosures.

As shown in FIG. 1, the submotors A, B, C are enclosed within a housing 174, and in this figure. The electric motor 100 is mounted on a base 176, although other suitable mounts can be used.

Each of the submotors (A, B, C) includes a stator component 101 and a rotor component 103 that is rotatable with respect to the stator component 101. For each submotor (A, B, C), one of the stator component 101 or the rotor component 103 includes a plurality of magnets 105, and the other of the stator component 101 and the rotor component 103 includes a plurality of conductive windings 107 that are operatively associated with the plurality of magnets 105 to produce torque in the rotor component 103, causing the rotor component 103 to rotate about, and with respect to, the stator component 101, producing a torque force and outputting mechanical power which can be used to move one or more mechanical components. For example, the mechanical power can be used to drive and/or rotate one or more shafts, gears, pulleys, belts, and/or other suitable mechanisms, enabling the electric motor 100 to power one or more devices.

According to various embodiments, the rotor component 103 is exterior to the axle and rotated around the stator component 101, including axle 156, and bearings 178 can be provided to facilitate such rotation. In other embodiments, the rotor component 103 is positioned on the interior and the stator component 101 is positioned on the exterior.

According to various embodiments, the conductive windings 107 are wrapped around a core 146, configured to maintain a shape of the conductive windings 107. The core 146 can include a series of slots 146a through which conductive wires to be wound to form the windings can be inserted and wound around the core protrusions between the slots. In some embodiments, the core 146 is made of a material that, when a magnet moves past the material, the poles of the atoms of the material align, generating a magnetic field, such as iron and/or steel. In the embodiment shown, the core 146 is assembled from stacked metal discs.

Submotor A includes stator component 108 and rotor component 110 that is rotatable with respect to stator component 108. Rotor component 110 includes a plurality of submotor magnets 112 (including magnets 112a and 112b, having opposing polarities), and the stator component 108 includes a plurality of conductive windings 114 that are operatively associated with the plurality of submotor magnets 112 to produce torque in the rotor component 110. In other embodiments, the stator component 108 includes the plurality of submotor magnets 112 and the rotor component 110 includes the plurality of conductive windings 114. The plurality of submotor magnets 112 includes magnets alternating between one or more magnets 112a of a first polarity and one or more magnets 112b of an opposing polarity.

Submotor B includes stator component 116 and rotor component 118 that is rotatable with respect to stator component 116. Rotor component 116 includes a plurality of submotor magnets 120 (including magnets 120a and 120b), and the stator component 116 includes a plurality of conductive windings 122 that are operatively associated with the plurality of submotor magnets 120 to produce torque in the rotor component 118. In other embodiments, stator component 116 includes the plurality of submotor magnets 120 and rotor component 118 includes the plurality of conductive windings 122. The plurality of submotor magnets 120 includes magnets alternating between one or more magnets 120a of a first polarity and one or more magnets 120b of an opposing polarity.

Submotor C includes stator component 124 and rotor component 126 that is rotatable with respect to stator component 124. Rotor component 126 includes a plurality of submotor magnets 128 (including magnets 128a and 128b), and stator component 124 includes a plurality of conductive windings 130 that are operatively associated with the plurality of submotor magnets 128 to produce torque in rotor component 126. In other embodiments, stator component 124 includes the plurality of submotor magnets 128 and the rotor component 126 includes the plurality of conductive windings 130. The plurality of submotor magnets 128 includes magnets alternating between one or more magnets 128a of a first polarity and one or more magnets 128b of an opposing polarity.

According to various embodiments, the plurality of submotors (A, B, C) includes one or more axial submotors (e.g., submotors A, C) positioned adjacent one or more radial submotors (e.g., submotor B). For example, as shown in the embodiments of FIGS. 1-4, the electric motor includes a combination of axial (A, C) and radial (B) submotors, with the radial submotor (B) positioned between the axial (A, C) submotors, resulting in the electric motor 100 alternating between axial (A, C) and radial (B) submotors.

According to various embodiments, the magnets (e.g., the plurality of submotor magnets 112, submotor magnets 120, and submotor magnets 128) include one or both of permanent magnets and electromagnets. In some embodiments, all of the magnets are either permanent magnets or electromagnets, and others include a combination of permanent magnets and electromagnets. According to various embodiments, the submotors can include permanent magnets, electromagnets, and/or a combination of permanent magnets and electromagnets.

One or more of the conductive windings of a submotor are electrically connected in series to at least one of the conductive windings of a subsequent submotor. For example, at least one of the conductive windings 114 is electrically connected in series to at least one of the conductive windings 122 and/or at least one of the conductive windings 122 is electrically connected in series to at least one of the conductive windings 130.

According to some embodiments, each of the conductive windings of a submotor is electrically connected in series to at least one of the conductive windings of a subsequent submotor. For example, each of the conductive windings 114 can be electrically connected in series to at least one of the conductive windings 122, and each of the conductive windings 122 is electrically connected in series to at least one of the conductive windings 114. According to some embodiments, each of the conductive windings 122 can be electrically connected in series to at least one of the conductive windings 130, and each of the conductive windings 130 is electrically connected in series to at least one of the conductive windings 122.

Figure 9A:
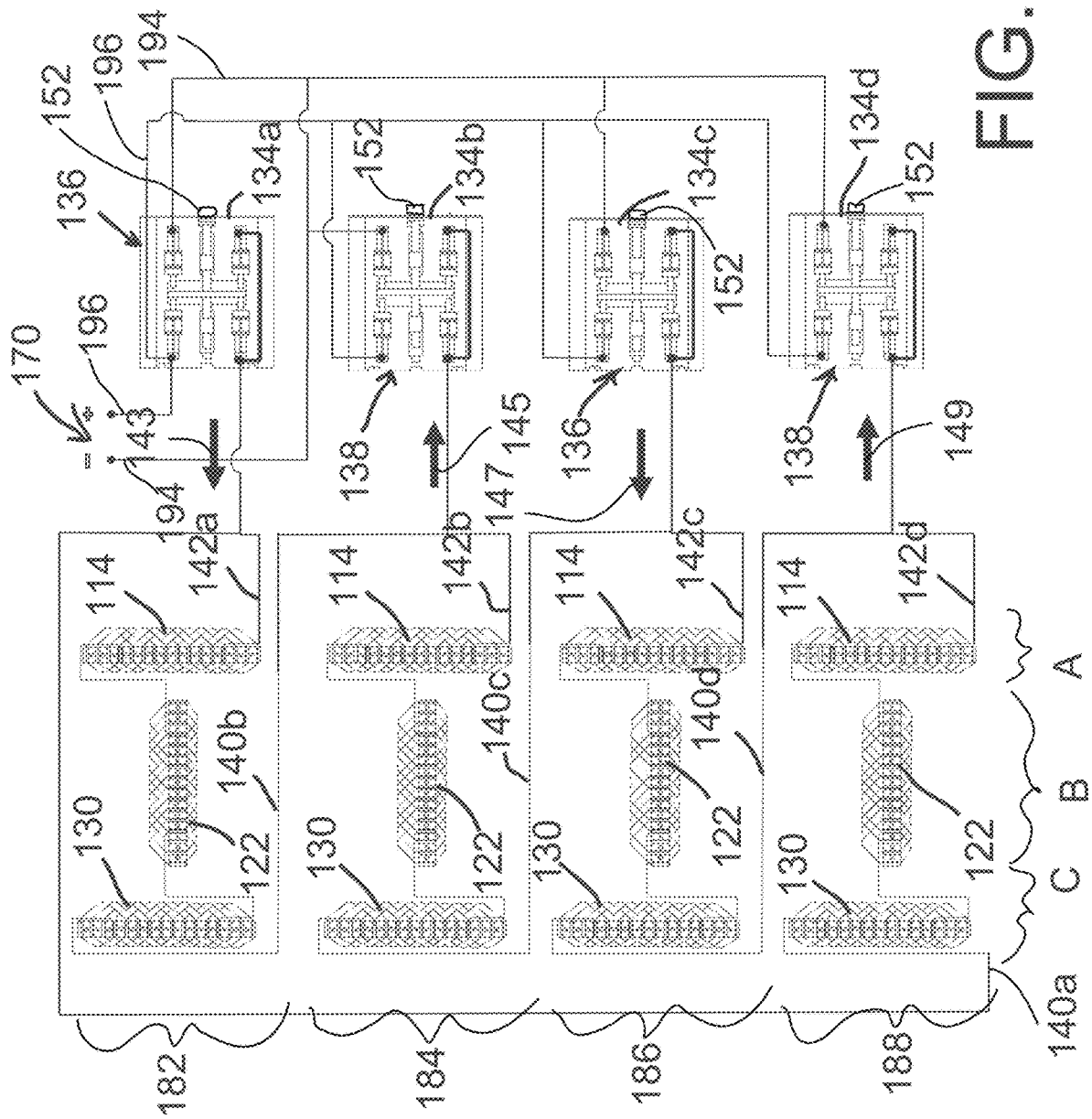
FIG. 9A is an electrical diagram of the commutator and the conductive windings, connected in series.
Figure 9B:
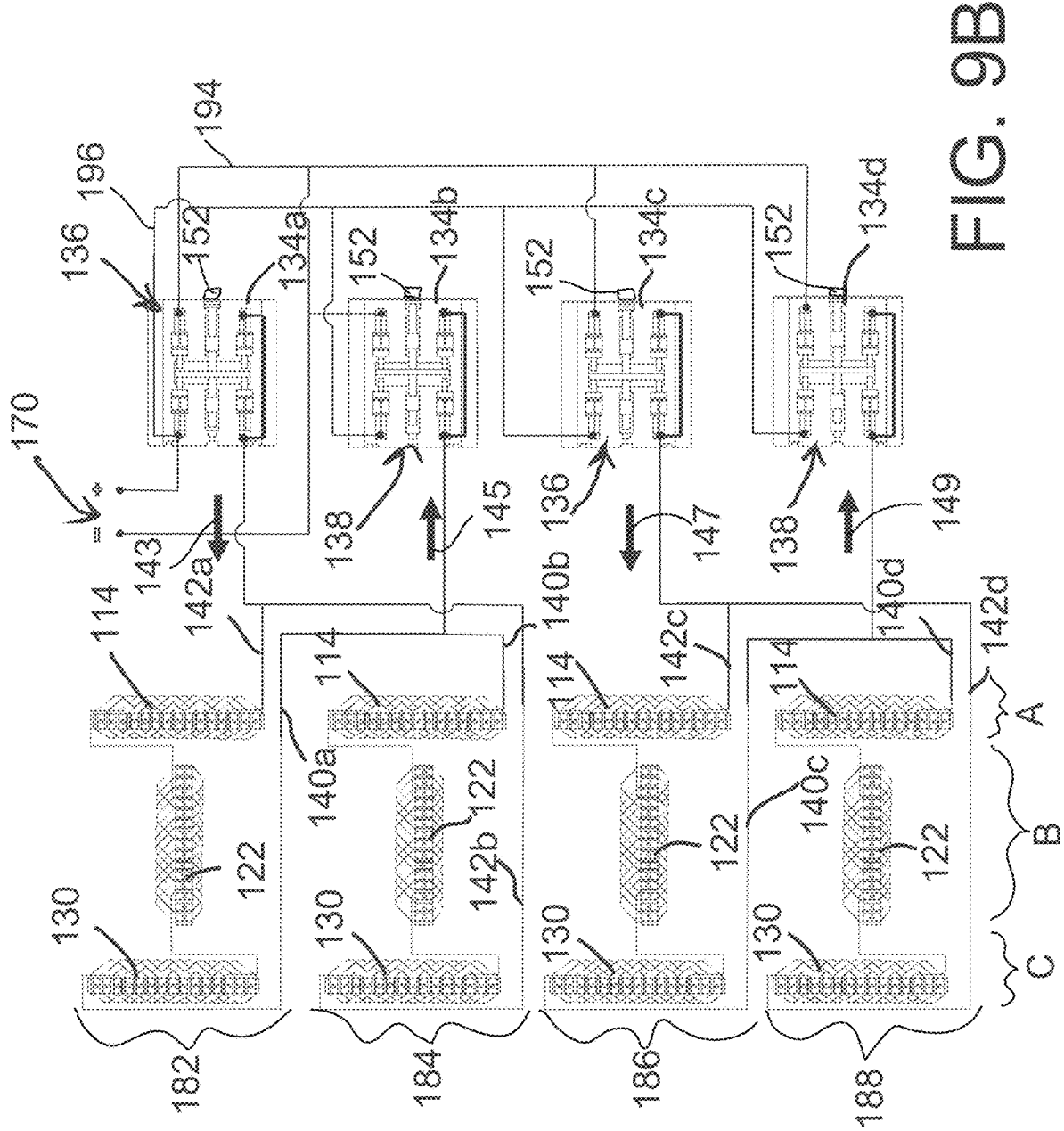
FIG. 9B is an electrical diagram of the commutator and the conductive windings, connected in parallel.

The plurality of magnets and conductive windings of each of the submotors A, B, C are arranged such that each of the submotors includes a plurality of phases 182, 184, 186, 188 (as shown, for example, in FIGS. 9A-9C). Each phase 182, 184, 186, 188 includes at least one magnet and at least one conductive winding. According to various embodiments, each of the submotors includes the same number of phases. For example, as shown in the electric motor 100 in FIGS. 1-4, each submotor (A, B, C) is a two-phase submotor, alternating 90 degrees from each positive phase to each negative phase, and vice versa. It is noted, however, that, in other embodiments, each of the submotors can be configured to incorporate other numbers of phases. For example, one or more of the submotors can be a three-phase submotor.

According to various embodiments, the conductive windings of each phase of a submotor are connected in series to conductive windings for the same phase of a subsequent submotor. For example, conductive windings 114 of submotor A of phase 182 are connected in series to conductive windings 122 of submotor B for the same phase 182, and conductive windings 122 of submotor B of phase 182 are connected in series to conductive windings 130 of submotor C for the same phase 182.

According to various embodiments, the submotors are coaxial. According to various embodiments, all of the submotors (A, B, C) are part of a single rotor and are fixed with respect to each other. For example, rotor component 110, 118, and 126 are part of a single rotor and are fixed with respect to each other, rotating along a same axis.

As shown in FIGS. 1-4, all of the submotors (A, B, C) are coaxial. According to various embodiments, each of the submotors includes magnets of alternating polarity, alternating between having north polarity (112a, 120a, 128a) and south polarity (112b, 120b, 128b) circumferentially around the submotor. For example, in FIGS. 1-4, the plurality of submotor magnets 112 includes magnets of alternating polarity 112a, 112b circumferentially around submotor A, the plurality of submotor magnets 120 includes magnets of alternating polarity 120a, 120b circumferentially around submotor B, and the plurality of submotor magnets 128 includes magnets of alternating polarity 128a, 128b circumferentially around submotor C.

According to various embodiments, the polarities of the magnets of a submotor are coaxially out of phase with the polarities of the magnets of a subsequent submotor. For example, as shown in FIGS. 1-4, the polarities of submotor magnets 112 are coaxially out of phase with the polarities of submotor magnets 120, and the polarities of submotor magnets 120 are coaxially out of phase with the polarities of submotor magnets 128. According to various embodiments, submotor magnets 112 of a first phase are circumferentially shifted in a rotational direction coaxially with respect to submotor magnets 120 of the first phase which in turn are circumferentially shifted coaxially with respect to submotor magnets 128 of the first phase. Similarly, submotor magnets 112 of a second phase are circumferentially shifted coaxially with respect to submotor magnets 120 of the second phase which in turn are circumferentially shifted coaxially with respect to submotor magnets 128 of the second phase. According to various embodiments, the magnets are shifted circumferentially by an angle corresponding to a width of the phase. According to various embodiments, each phase corresponds to a segment of each submotor and the angle corresponds to a width of a respective segment of each phase. For example, submotors A, B, C include two phases, equating to a 90° shift. It is noted, however, that, depending on the position and number of phases, the angle can be other suitable degrees.

Figure 5:
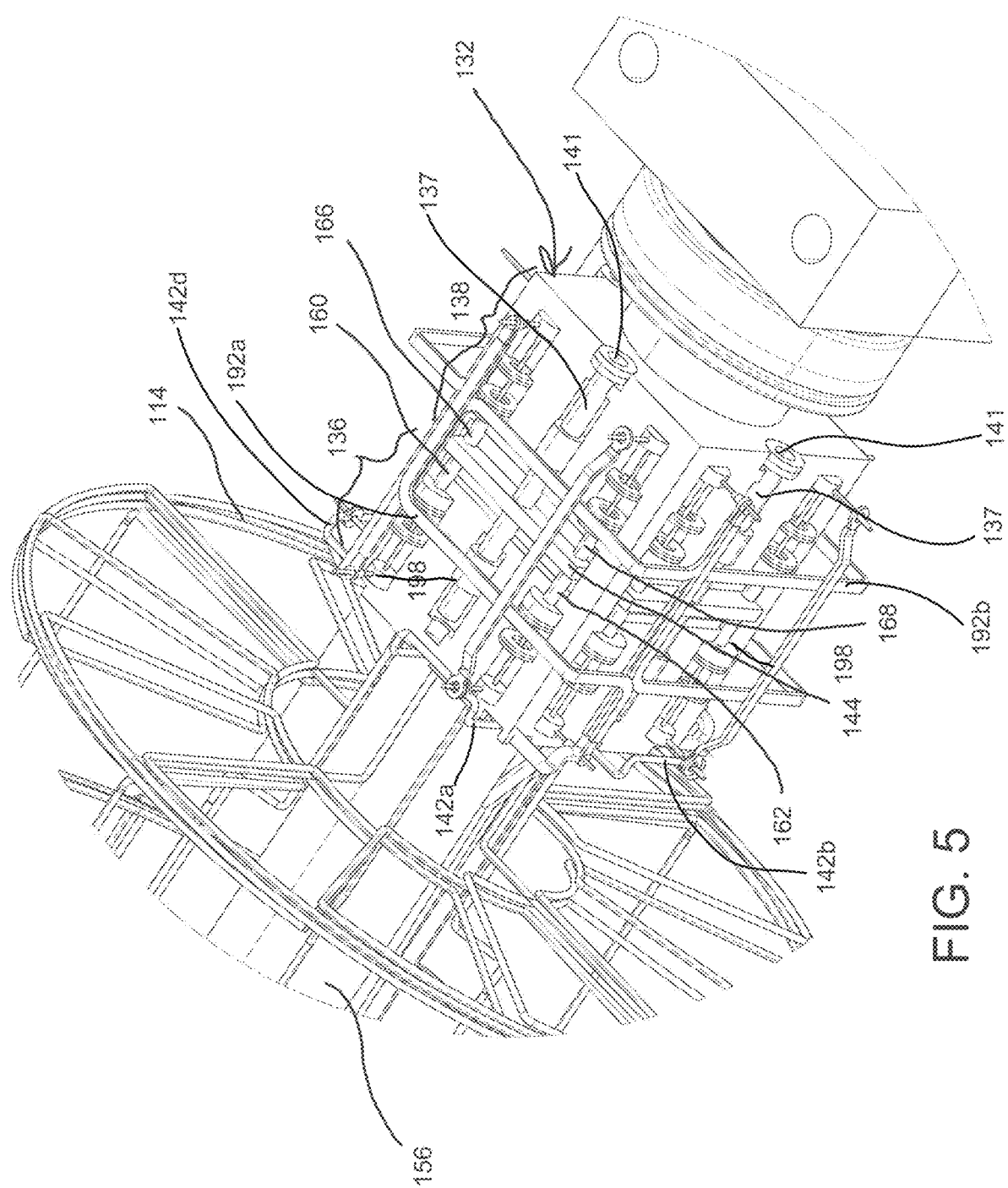
FIG. 5 is a perspective, blown-up view of the commutator of the electric motor of FIG. 4.
Figure 6:
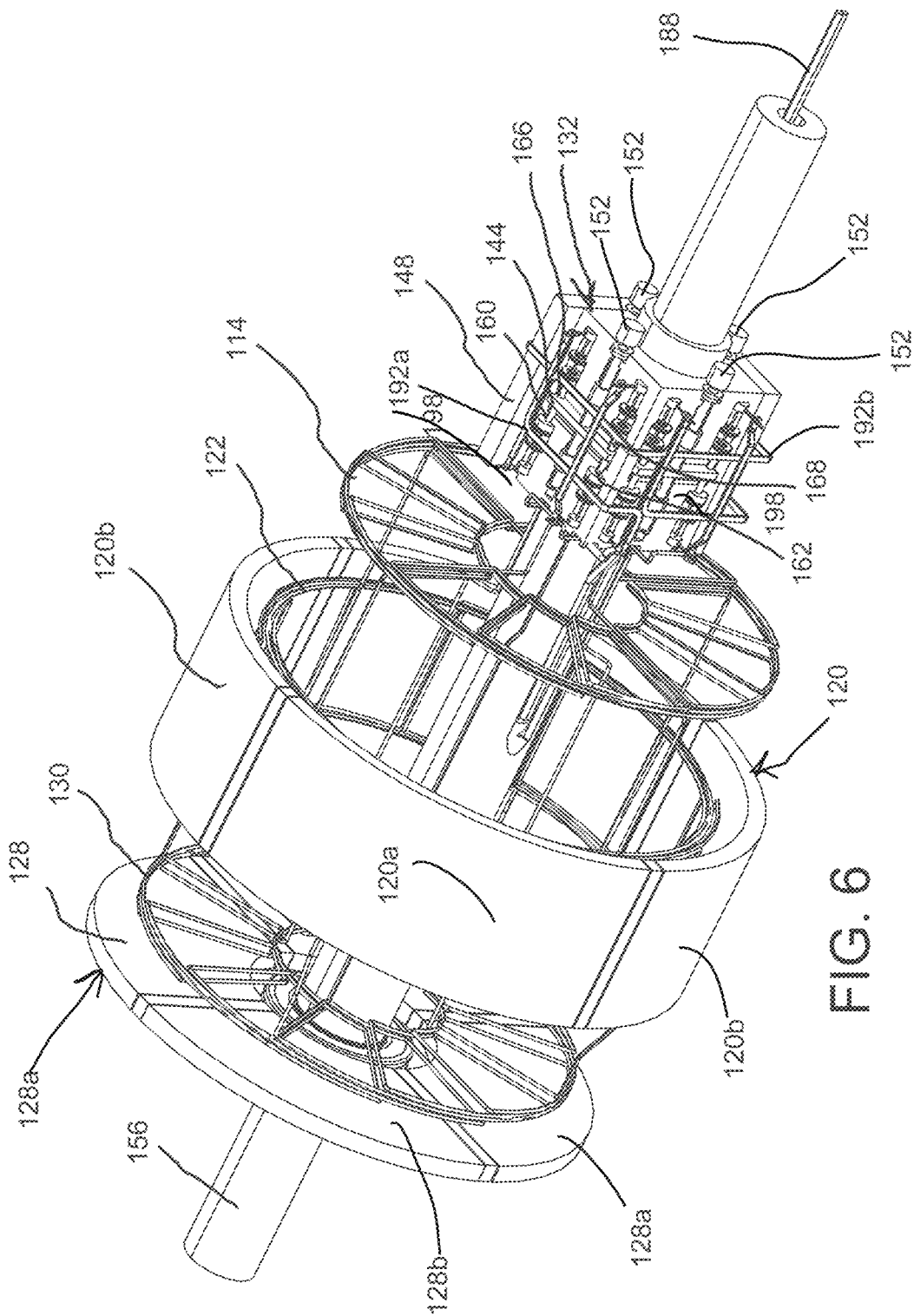
FIG. 6 is a perspective view of the electric motor of FIG. 1 with the outer housing, cores, and commutator casing removed.

The electric motor 100 includes a commutator 132, shown in more detail in FIG. 5. The commutator 132 is electronically connected to each of the conductive windings (e.g., conductive windings 114, 122, and 130) and is configured to direct a flow of current to each of the conductive windings. According to various embodiments, the stators 101 and/or commutator 132 are supplied mechanical power via one or more sources.

The commutator 132 includes a plurality of switches 134a, 134b, 134c, 134d. The number of switches in various embodiments corresponds to the number of phases of windings in the motor, which in the embodiment shown is four. Each switch 134 includes a positive position 136 and a negative position 138, configured to direct a positive or negative flow of current to each of the conductive windings. The positive position 136 and negative position 138 are the only stable, operative positions of the commutator 132, and there is no stable state of a switch 134 in which the switch 134 is open, with neither a positive nor negative polarity. In other embodiments, the commutator 132 is configured such that there is a stable state of a switch 134 in which the switch 134 is open, with neither a positive nor negative polarity.

According to various embodiments, the commutator 132 is configured to switch directly from the positive position 136 to the negative position 138, and directly from the negative position 138 to the positive position 136. According to various embodiments, the commutator 132 is configured to alternate the flow of current for each phase 182, 184, 186, 188 of the electric motor 100, producing a torque force causing the one or more rotor components to rotate around the one or more stator components. According to various embodiments, each set of conductive windings (e.g., conductive windings 114, 122, and 130) are connected, at a first end 140a, 140b, 140c, 140d, to a subsequent set of conductive windings, and connected, at a second end 142a, 142b, 142c, 142d, to a switch 134 of the commutator 132. According to various embodiments, each switch 134a, 134b, 134c, 134d is connected to each subsequent switch via one or more contacts (e.g., wires or other suitable mechanisms) 192 (192a, 192b).

While the commutator 132 can provide higher efficiency than other traditional commutators, the commutator 132 can be used in conjunction with other suitable types of motors. For example, the commutator 132 can be used in electric motors having a singular motor which is not separated into individual submotors. Additionally, in other embodiments of motors that use multiple submotors as described herein, instead of the commutator 132, other known types of electronic and mechanical devices to distribute current from an AC or DC source to the various phases can be used, including other known types of commutators, such commutators that use brushes to provide a brushed electric motor, or other suitable commutators.

As shown in more detail in FIGS. 8A-9B, each switch is connected, from a power source 170, to a positive current via positive current connector 194 or negative current via a negative current connector 196. The current connectors 194, 196 may be wire and/or other suitable material. Current connectors 194, 196 may correlate to connectors 192.

According to various embodiments, the switches 134 include one or more biasing members configured to bias one or more of the switches 134 to the positive position 136 or to the negative position 138. The biasing member may be a spring, a magnet, or other suitable biasing member. According to other embodiments, the switches 134 do not include any biasing member.

Figure 7:
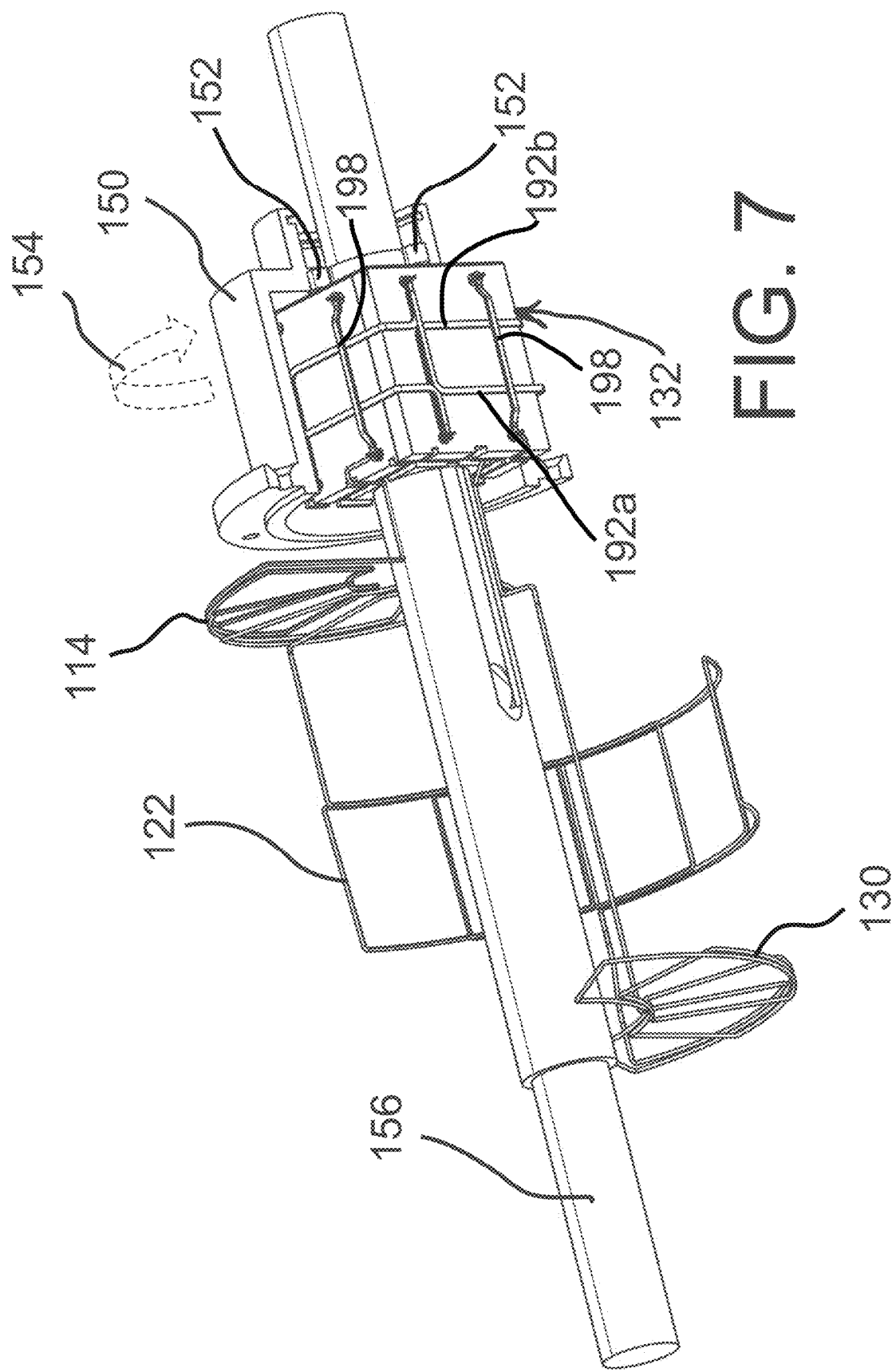
FIG. 7 is a perspective view of the commutator of FIG. 5, mounted on a fixed axle, with a cut-away of a rotatable housing surrounding the commutator.

The commutator 132 can include a casing 148, shown in FIGS. 2A-3 and 7, and a housing 150 surrounding the casing 148, shown in FIGS. 1 and 7. As shown in FIG. 7, the commutator 132 and the cores 146 are mounted on a fixed component 156. The housing 150 is configured to rotate around the fixed component and, vicariously, the commutator 132, along direction 154. According to various embodiments, the commutator housing 150 is configured to rotate integral with housing 174. The housing rotates via a rotation means such as, for example, bearings 180. The housing 150 includes one or more magnets 152. As the housing 150 rotates in direction 154, the magnets 152 rotate around the commutator 132. During rotation, the position of the magnets 152 in relation to magnets 141 of the switches 134 causes the switches 134 to alternate between the positive position 136 and the negative position 138, altering the direction of flow of the current to the conductive windings. Referring to FIG. 7, the conductive windings for one phase for all three submotors A, B, C is shown.

Figure 8B:
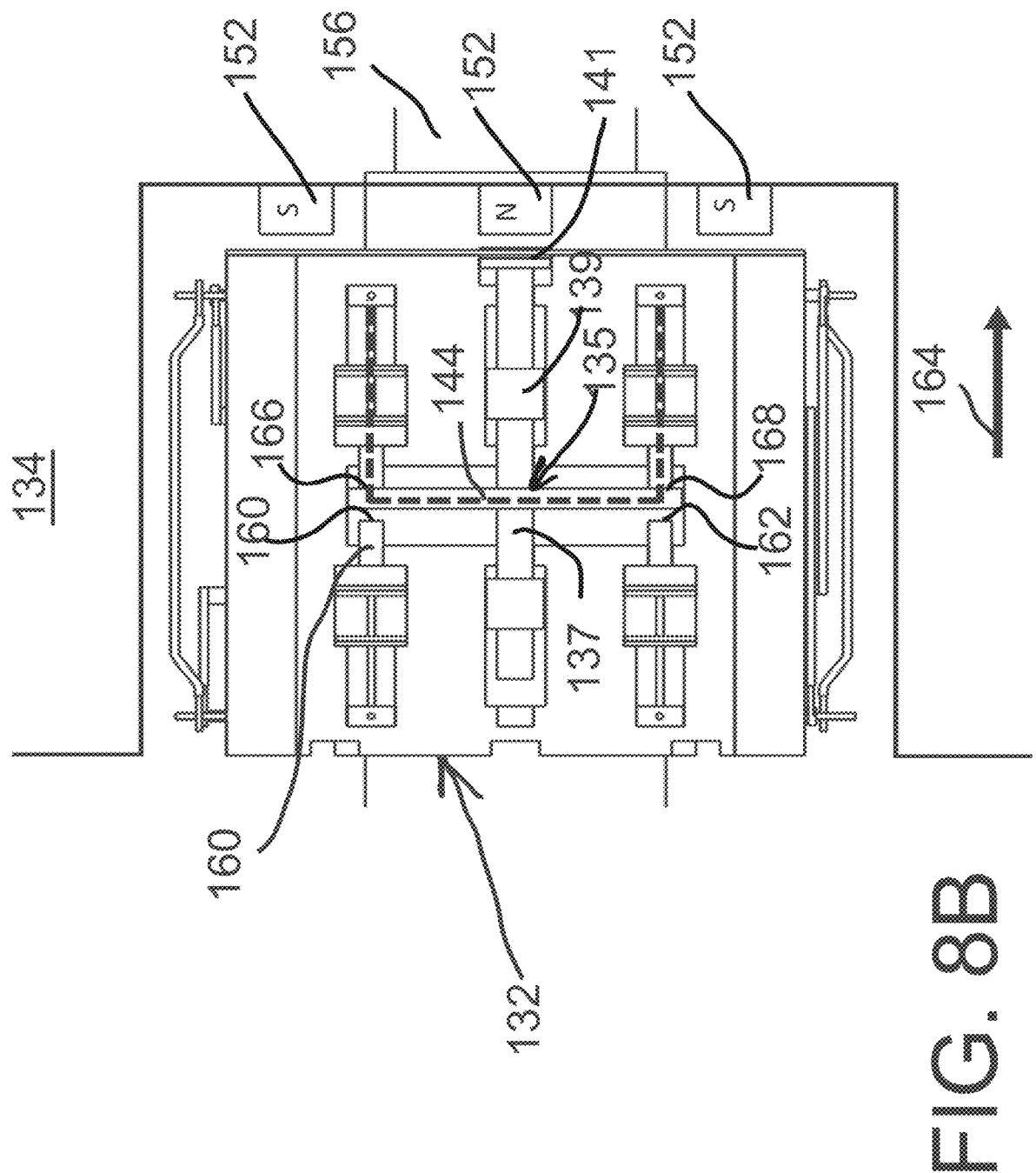
FIG. 8B is a view of a face of the commutator of FIG. 5 with the commutator switch in a negative position.

Switch 134 of the commutator 132 is shown in the positive position 136 in FIG. 8A, and in the negative position 138 in FIG. 8B. According to various embodiments, each switch 134 includes a movable switching element 135. The movable switching element 135 in this embodiment includes a cross-bar-shaped element, including a sliding element 137, configured to slide through a bushing 139, and a cross connector member 144, perpendicular to the sliding element 137, although other suitable arrangements can be used. The movable switching element 135 includes a magnet 141 positioned to interact with the housing magnets 152 as they rotate near the magnet 141. As the housing magnets 152 rotate around the axle 156, they attract or repulse the switch magnet 141, causes the sliding element to slide through the bushing 139. This, in turn, causes the cross member 144 to contact a positive electrical contact 160 and a grounding contact 162 (the positive position 136) or a negative electrical contact 166 and a grounding contact 168 (the negative position 138). Conventional current flow indicates that current flows from a positive direction to a negative direction. According to various embodiments, grounding connectors 162, 168 are connected to each other via connector 198. It is noted, however, that, in some embodiments, other suitable arrangements for directing a flow of current to the conductive windings can be implemented in other embodiments.

As shown in FIG. 8A, the housing magnets 152 cause a pushing force in direction 158, causing the cross member 144 to contact electrical contacts 160, 162, resulting in a positive current flowing through a conductive winding. As shown in FIG. 8B, the housing magnets 152 cause a pulling force in direction 164, causing the cross member 144 to contact electrical contacts 166, 168, resulting in a negative current flowing through a conductive winding. It is noted, however, that, in other embodiments, the pushing force results in a negative flow of current, and/or the pulling force results in a positive flow of current. In FIGS. 8A-8B, the dashed lines represent the current flow.

For each phase 182, 184, 186, 188 of the electric motor 100, the conductive windings can be connected, in series, as shown in FIG. 9A, or in parallel, as shown in FIG. 9B. As shown in FIGS. 9A-9B, sets of conductive windings 114, 122, and 130 are connected to each other. Each set of conductive windings is connected to a switch 134 of the commutator 132. Each switch 134 is configured to control the flow of current through a set of conductive windings.

According to the embodiment shown in FIG. 9A, the sets of conductive windings are each connected to a switch 134 and are connected to each other in series. Switch 134a is in the positive position 136, with current flowing through the phase 182 of the submotors A, B, C, in direction 143. Switch 134b is in the negative position 138, with current flowing through the phase 184 of the submotors A, B, C, in direction 145. Switch 134c is in the positive position 136, with current flowing through the phase 186 of the submotors A, B, C, in direction 147. Switch 134d is in the negative position 138, with current flowing through the phase 188 of the submotors A, B, C, in direction 149.

According to the embodiment shown in FIG. 9B, the sets of conductive windings are each connected to a switch 134 and are connected to each other in parallel, with pairs of two sets of conductive windings connected to each other. Switch 134a is in the positive position 136, with current flowing through the phase 182 of the submotors A, B, C, in direction 143, passing through phase 184 of the submotors A, B, C, in direction 145, and into switch 134b, which is in the negative position 138. Switch 134c is in the positive position 136, with current flowing through the phase 186 of the submotors A, B, C, in direction 147, passing through phase 188 of the submotors A, B, C, in direction 149, and into switch 134d, which is in the negative position 138.

According to alternative embodiments, such as shown in FIG. 9C, the electric motor is an alternative current (AC) motor having a power source 170 (e.g., a battery or other suitable power source) which sends power to an AC/DC interface frequency amplifier 172 which in turn controls the flow of current through the phases 182, 184, 186, 188 of the conductive windings of the submotors A, B, C. The power source can include electronics that direct current to the various phases of the submotors, as known in the art.

The structure of the electric motors of the present disclosure enable the use of long runs of conductive wires. Due to the long runs of conductive wires, the electric motor 100 creates less heat and can run more efficiently. Furthermore, the long runs of wires enable the windings to take a much larger range of voltages than a typical motor without requiring heat sinks. For example, the electric motor 100 may be used with power line voltages of 12V, 24V, 36V, and/or 48V. It is noted that the electric motor 100 may be used with other suitable power line voltages, depending on the materials used in the manufacture of the electric motor 100. Additionally, due to the windings of the individual submotors being connected to each other, the electric motor 100 can incorporate conductive winding cable much longer than in conventional motors.

Figure 10A:
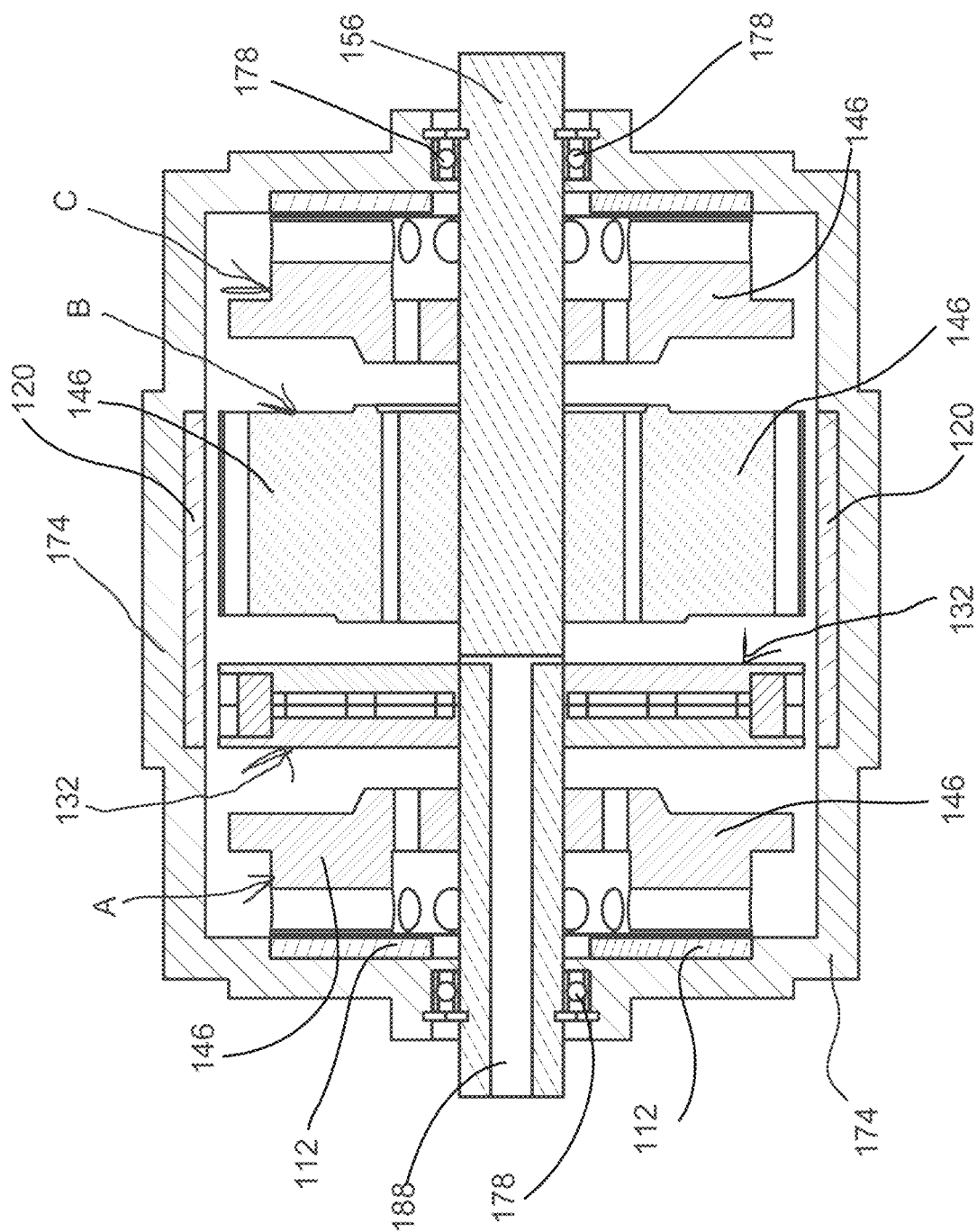
FIG. 10A is a sectional side view of another embodiment of electric motor having a commutator positioned between submotors.
Figure 10B:
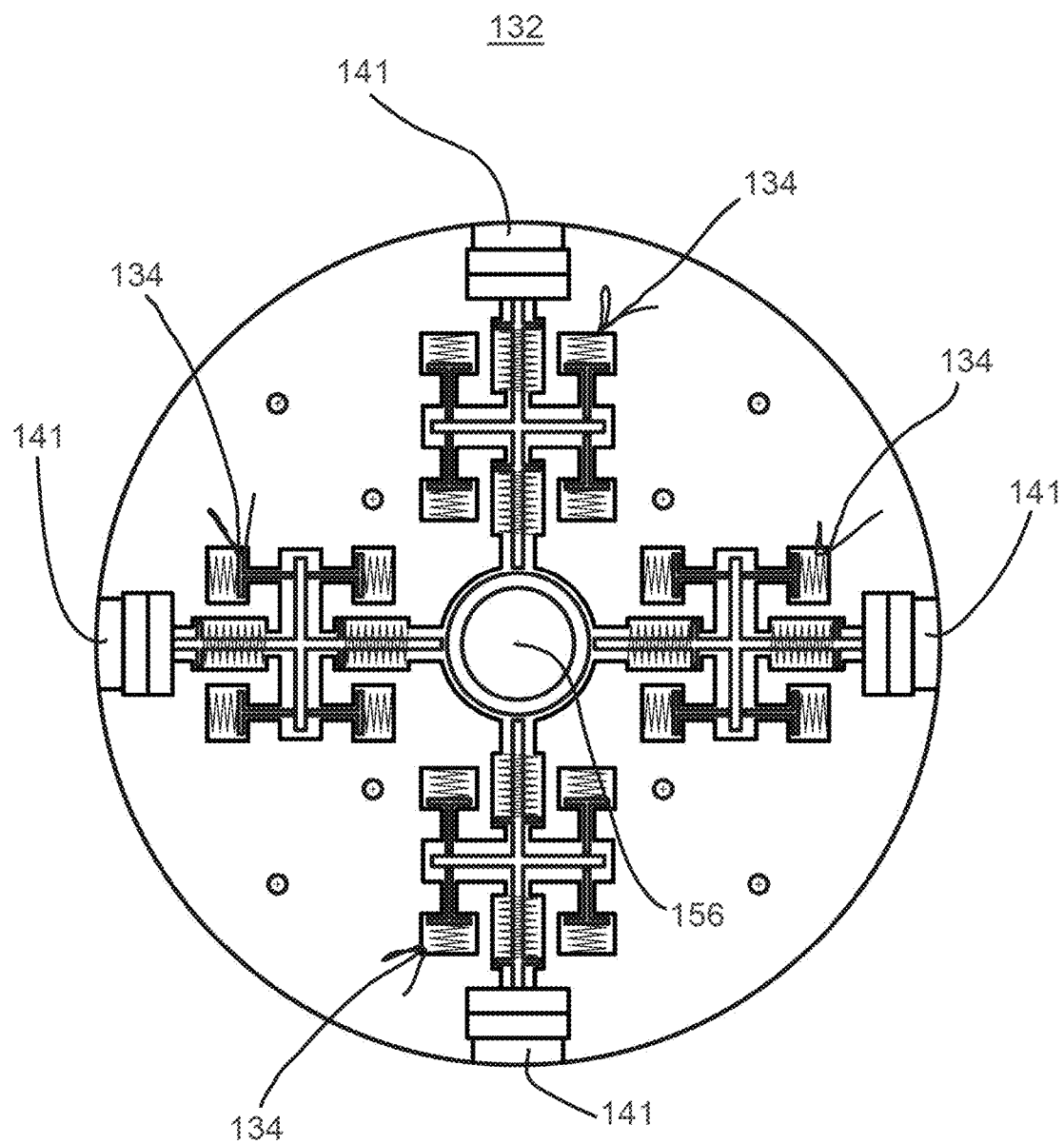
FIG. 10B is a side view of a commutator of FIG. 10A.

Referring to FIGS. 10A and 10B, according to some alternative embodiments, an electric motor 100 is provided having a commutator 132 positioned between adjacent submotors A, B. For clarity, the windings are not shown. According to the embodiment shown, all of the submotors A, B, C, and the commutator 132 are housed within a housing 174. Magnet 120, in FIG. 10A, is used to control both movement of submotor B and the commutator 132.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is also to be understood that the terminology used herein is for describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. An electric motor, comprising:
a first submotor that includes a first stator component and a first rotor component that is rotatable with respect to the first stator component, one of the first stator component and the first rotor component including a plurality of first magnets, and the other of the first stator component and the first rotor component including a plurality of conductive first windings that are operatively associated with the plurality of first magnets to produce torque in the first rotor component; and
a second submotor that includes a second stator component and a second rotor component that is rotatable with respect to the second rotor component, one of the second stator component and the second rotor component including a plurality of second magnets, and the other of the second stator component and the second rotor component including a plurality of conductive second windings that are operatively associated with the plurality of second magnets to produce torque in the second rotor component;
wherein at least one of the plurality of conductive first windings is electrically connected in series to at least one of the plurality of conductive second windings, and
wherein the first and second submotors are coaxial.

2. The electric motor of claim 1, wherein each of the plurality of conductive first windings is electrically connected in series to at least one of the plurality of conductive second windings.

3. The electric motor of claim 2, wherein each of the plurality of conductive second windings is electrically connected in series to at least one of the plurality of conductive first windings.

4. The electric motor of claim 1, wherein the first and second submotors have a same number of phases that include different sets of the plurality of conductive first windings and magnets and different sets of the plurality of conductive second windings and magnets, respectively, wherein the plurality of conductive first windings and the plurality of ductive second windings of each phase are connected in series.

5. The electric motor of claim 1, wherein:
the first submotor has:
a first phase that includes at least one of the plurality of first magnets and at least one of the plurality of conductive first windings, and
a second phase that includes at least another of the plurality of first magnets and another of the plurality of conductive first windings; and
the second submotor has:
a first phase that includes at least one of the plurality of second magnets and at least one of the plurality of conductive second windings, which second windings of the first phase are connected in series with the plurality of conductive first windings of the first phase, and
a second phase that includes at least another of the plurality of second magnets and another of the plurality of conductive second windings, which second windings of the second phase are connected in series with the plurality of conductive first windings of the second phase.

6. The electric motor of claim 5, further comprising a third submotor, including a third stator component and a third rotor component that is rotatable with respect to the third rotor component, one of the third stator component and the third rotor component including a plurality of third magnets, and the other of the third stator component and the third rotor component including a plurality of conductive third windings that are operatively associated with the plurality of third magnets to produce torque in the third rotor component.

7. The electric motor of claim 6, wherein the third motor has:
a first phase that includes at least one of the plurality of conductive third magnets and at least one of the plurality of conductive third windings, which third windings of the first phase are connected in series with the plurality of conductive first windings and the plurality of conductive second windings of the first phase, and
a second phase that includes at least another of the plurality of conductive third magnets and another of the plurality of conductive third windings, which third windings of the second phase are connected in series with the plurality of conductive first windings and the plurality of conductive second windings of the second phase.

8. The electric motor of claim 6, wherein the first, second, and third submotors are coaxial.

9. The electric motor of claim 8, wherein:
the plurality of first magnets includes magnets of alternating polarity, alternating between north and south circumferentially around the first submotor;
the plurality of second magnets includes magnets of alternating polarity, alternating between north and south circumferentially around the second submotor; and
the polarities of the plurality of first magnets are coaxially out of phase with the polarities of the plurality of second magnets.

10. The electric motor of claim 6, wherein the first and third submotors are axial submotors, and the second submotor is a radial submotor.

11. The electric motor of claim 5, wherein:
the plurality of first magnets of the first phase are circumferentially shifted coaxially with respect to the lurality of second magnets of the first phase; and
the plurality of first magnets of the second phase are circumferentially shifted coaxially with respect to the plurality of second magnets of the second phase.

12. The electric motor of claim 11, wherein:
the plurality of first magnets of the first phase are shifted circumferentially by an angle corresponding to a width of the first phase; and
the plurality of first magnets of the second phase are shifted circumferentially by an angle corresponding to a width of the second phase.

13. The electric motor of claim 11, wherein:
the first and second submotors each include at least two phases, wherein the first and second submotors include a same number of phases;
each of the at least two phases corresponds to a segment of each of the first and second submotors; and
the plurality of first magnets of each phase are shifted circumferentially by an angle corresponding to a width of a respective segment of each phase.

14. An electric motor, comprising:
a stator; and
a rotor that is rotatable with respect to the stator;
wherein one of the stator and the rotor includes a plurality of magnets, and the other of the stator and the rotor includes a plurality of conductive windings that are operatively associated with the plurality of magnets to produce torque in the rotor;

wherein a plurality of sets of the plurality of magnets and the plurality of conductive windings are operatively associated as a plurality of submotors, each submotor including a portion of the stator and a portion of the rotor, and a plurality of phases of each submotor each include a group of the plurality of conductive windings and the plurality of magnets of the respective submotor;

wherein the plurality of submotors have a same number of phases, and the plurality of conductive windings within a same phase of the plurality of submotors are electrically connected in series; and wherein the plurality of submotors are coaxial.

15. The electric motor of claim 14, wherein the plurality of conductive windings and the plurality of magnets of each of the phases in each submotor are shifted circumferentially on the stator and the rotor with respect to the same phases in another of the plurality of submotors.

16. The electric motor of claim 15, wherein the plurality of conductive windings and the plurality of magnets of each of the phases in each submotor are shifted circumferentially by an angle corresponding to a width of each phase.

17. The electric motor of claim 15, wherein:
each of the plurality of phases corresponds to a segment of each of the submotors; and
for each phase, the plurality of conductive windings and the plurality of magnets in each submotor are shifted circumferentially by an angle corresponding to a width of each respective phase.

18. The electric motor of claim 14, further comprising a commutator electronically connected, and configured to direct a flow of current, to each of the plurality of conductive windings, the commutator including a plurality of switches, wherein each switch includes a positive position and a negative position.

19. The electric motor of claim 18, wherein:
the positive position and the negative position are the only operative positions of the commutator; and
the commutator is configured to switch directly from the positive position to the negative position and directly from the negative position to the positive position.

20. The electric motor of claim 18, wherein each of the plurality of conductive windings are connected, at one end, to a subsequent conductive winding, and connected, at a second end, to a switch of the commutator.

21. The electric motor of claim 14, wherein the plurality of submotors includes a radial submotor and an axial submotor.

22. The electric motor of claim 14, wherein the plurality of magnets includes one or both of permanent magnets and electromagnets.

23. The electric motor of claim 14, wherein the plurality of magnets of all of the plurality of submotors are permanent magnets or electromagnets.

24. An electric motor, comprising:
a stator; and
a rotor that is rotatable with respect to the stator;
wherein one of the stator and the rotor includes a plurality of magnets, and the other of the stator and the rotor includes a plurality of conductive windings that are operatively associated with the plurality of magnets to produce torque in the rotor;
wherein a plurality of sets of the plurality of magnets and the plurality of conductive windings are operatively associated as a plurality of submotors, each submotor including a portion of the stator and a portion of the rotor, and a plurality of phases of each submotor each include a group of the plurality of conductive windings and the plurality of magnets of the respective submotor;
wherein a plurality of phases of each submotor each include a group of the plurality of conductive windings and the plurality of magnets;
wherein a commutator electronically connected, and configured to direct a flow of current, to each of the plurality of conductive windings, the commutator including a plurality of switches, wherein each switch includes a positive position and a negative position; and
wherein the plurality of submotors are coaxial.

25. The electric motor of claim 24, wherein:
the positive position and the negative position are the only operative positions of the commutator; and
the commutator is configured to switch directly from the positive position to the negative position and directly from the negative position to the positive position.

26. The electric motor of claim 24, wherein each of the plurality of conductive windings are connected, at one end, to a subsequent conductive winding, and connected, at a second end, to a switch of the commutator.

* * * * *